No. 858,412. PATENTED JULY 2, 1907.
P. J. NEATE.
SPRING WHEEL.
APPLICATION FILED NOV. 7, 1905.

6 SHEETS—SHEET 2.

WITNESSES
Fred White
Rene' Ruine

INVENTOR:
Percy John Neate,
By his Attorneys
Arthur C. Fraser & Co.

No. 858,412. PATENTED JULY 2, 1907.
P. J. NEATE.
SPRING WHEEL.
APPLICATION FILED NOV. 7, 1905.
6 SHEETS—SHEET 3.
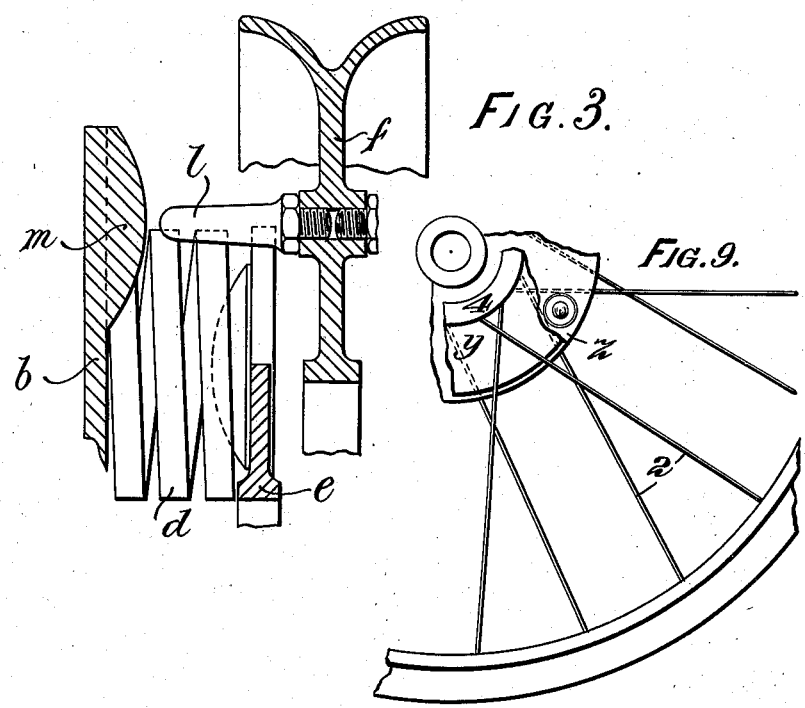
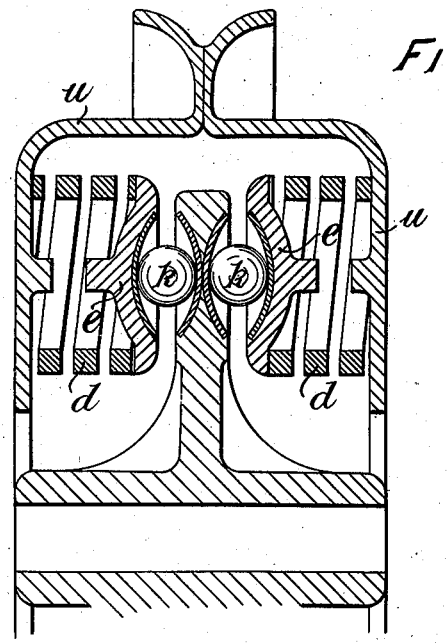
WITNESSES:
Fred White
René Bruine
INVENTOR:
Percy John Neate,
By his Attorneys
Arthur E. Frasert Co No. 858,412. PATENTED JULY 2, 1907.
P. J. NEATE.
SPRING WHEEL.
APPLICATION FILED NOV. 7, 1905.

6 SHEETS—SHEET 4.

WITNESSES:
Fred White
René Bruine

INVENTOR:
Percy John Neate,
By his Attorneys
Arthur E. Fraser & Co.

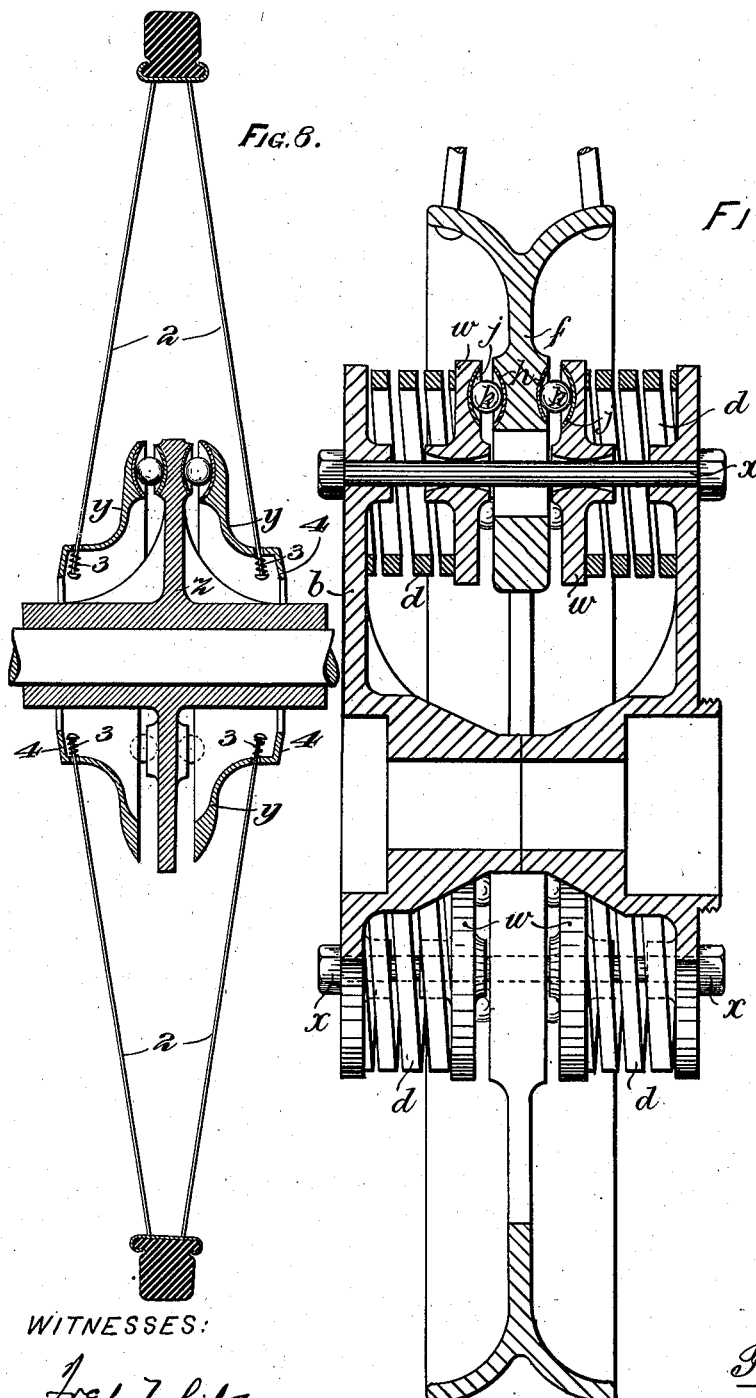

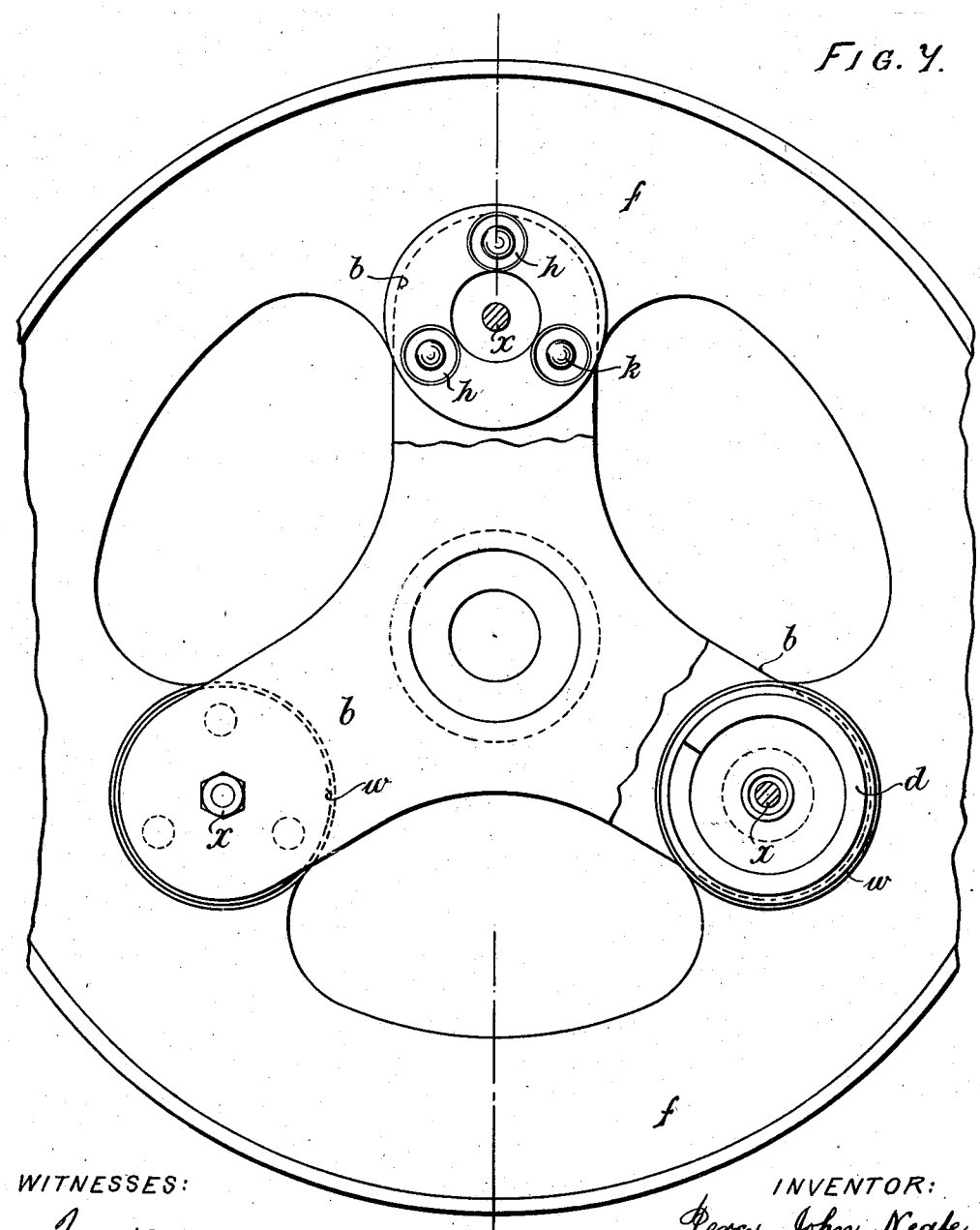

UNITED STATES PATENT OFFICE.

PERCY JOHN NEATE, OF ROCHESTER, ENGLAND.

SPRING-WHEEL.

No. 858,412.  Specification of Letters Patent.  Patented July 2, 1907.

Application filed November 7, 1905. Serial No. 286,280.

*To all whom it may concern:*

Be it known that I, PERCY JOHN NEATE, of Belsize, Watts avenue, Rochester, in the county of Kent, England, engineer, have invented certain new and useful Improvements in Spring-Wheels for Vehicles and Cycles, of which the following is a specification.

This invention relates to spring wheels for vehicles and cycles and has for its object to provide an improved construction of that type of spring wheel whereon in the stresses due to vertical displacement of the hub relatively to the rim are taken up by transverse or axial stresses on the parts or connections which couple the movable member to the hub or shaft or vice versa.

According to this invention the movable rim of the wheel is coupled to the hub member through the medium of springs acting approximately parallel to the axis of the wheel, the said springs being under variable tension or compression and acting from one member to the other as resilient supports, the connections preferably being made by causing the said springs to act upon surfaces of revolution such as cup-shaped recesses on each member kept apart by balls so arranged that radial or rotational movement of either member relatively to the other in any direction in the plane of the wheel serves to stress all the springs alike and so secure the required resiliency. Any movement other than radial or rotational, for instance, the movement due to torque combined with the load, will cause the springs to be unequally stressed although each spring will in rotation pass towards and recede from the point of maximum stress.

I will now refer to the accompanying drawings which illustrate some forms of my invention.

Figure 1:
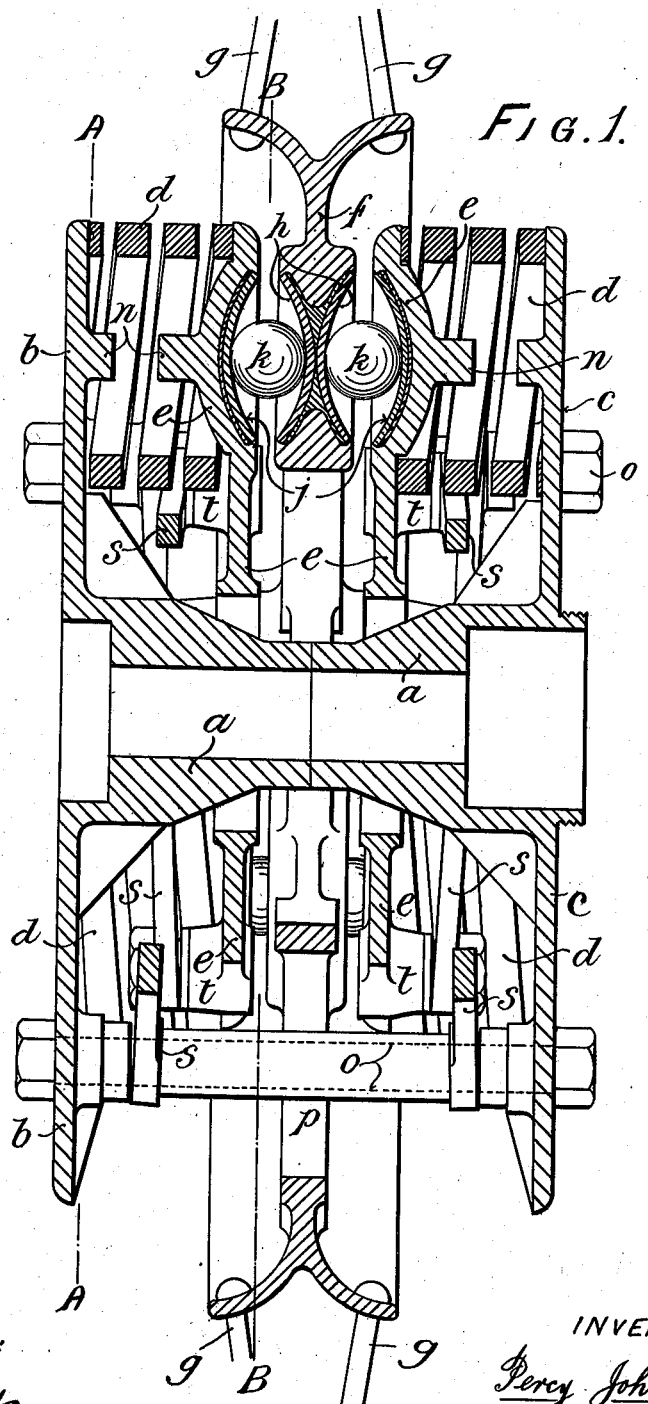
Figure 2:
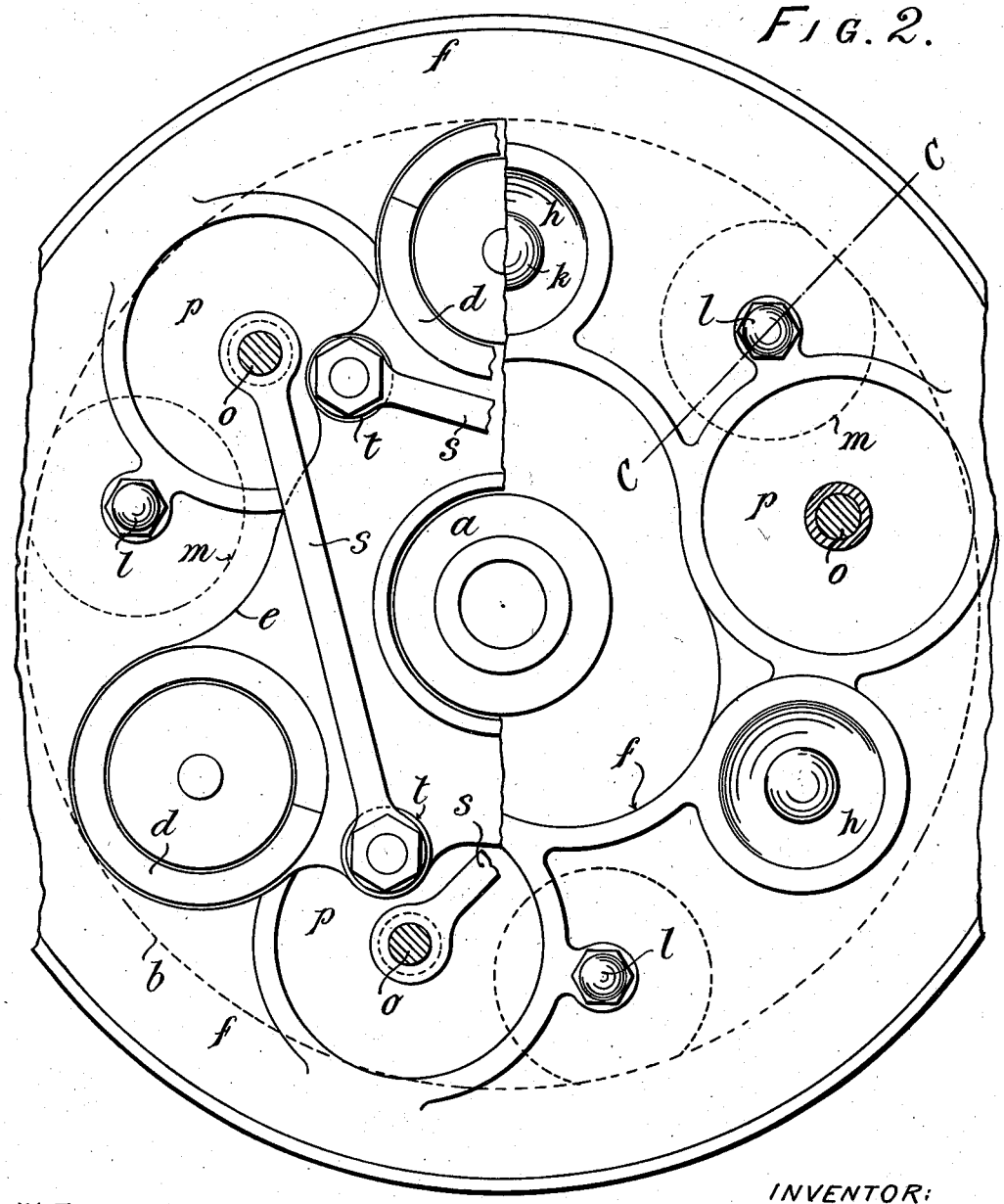
Figure 5:
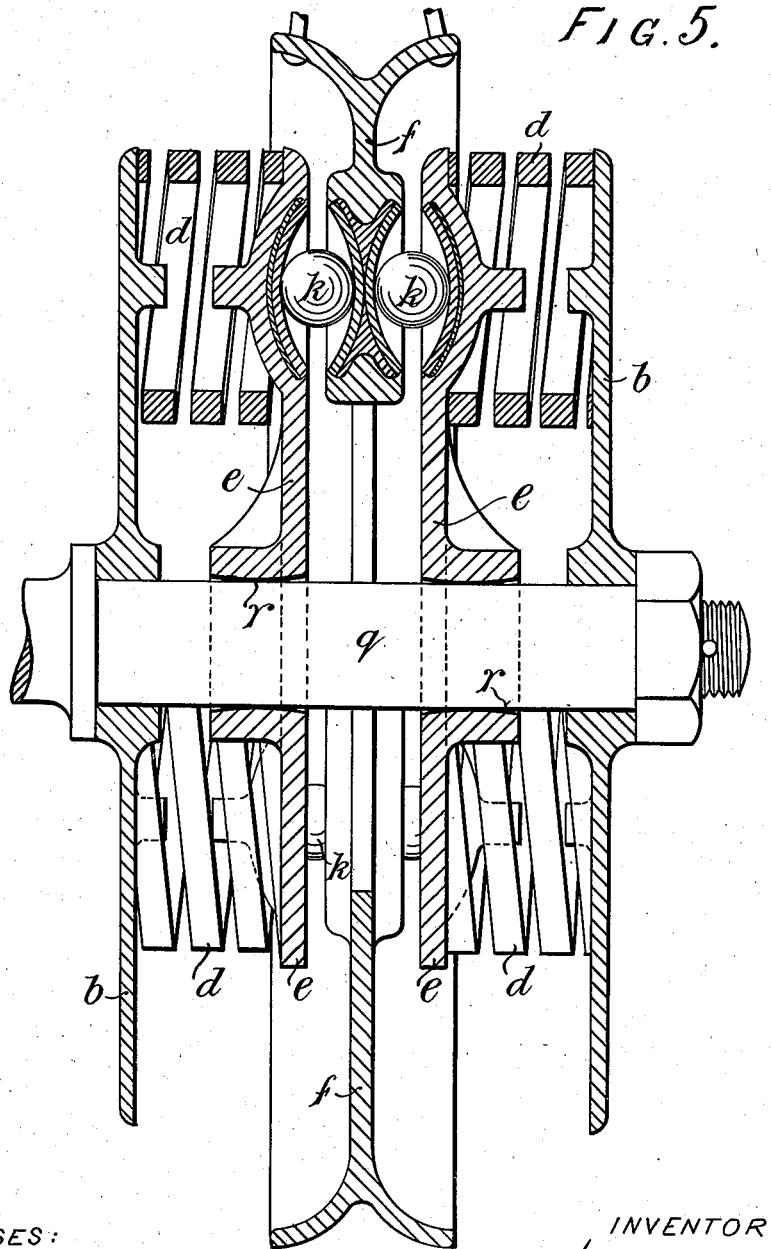

Figure 1 is a vertical section; Fig. 2 is a face view of Fig. 1, half in section on the line A—A, and half on the line B—B; Fig. 3 is a detailed section of Fig. 2 on the line C—C; Fig. 4 is a similar view to Fig. 1 showing a modified construction; Fig. 5 is a similar view to Fig. 1 showing a further modification; Figs. 6 and 7 are similar views to Figs. 1 and 2 with the exception that Fig. 7 shows only some parts broken away; Figs. 8 and 9 are similar views to Figs. 6 and 7 showing another modification.

Figs. 1 to 7 relate to that type of spring wheel where rolling cup and ball devices are employed for converting the relative movements of the hub and rim members into axial movements of the springs, by which I mean movements of the springs approximately parallel to the axis.

In Figs. 1 and 2, *a* is the hub of the wheel and *b* and *c* are the flanges suitably spaced apart. *d d* are coiled springs which press upon two cup carrying plates *e e* which are freely suspended between the flanges *b* and *c* and adapted to receive between them the rim flange *f* which is connected to the felly of the wheel by suitable spokes *g* coupled to lateral flanges at the outer edges of said rim flange. Both the rim flange *f* and the freely suspended cup carrying plates *e e* are fitted with cup-shaped recesses *h j* respectively, which recesses or cups face one another and form chambers in which are placed balls *k* one in each chamber and on which the opposing faces of the cups roll when the rim member moves relatively to the hub member, and owing to the cup shaped formation of these recesses any movement of the balls away from the bottoms of the cups due to their relative displacement will cause the surfaces of the cups carried by the plates *e e* to be moved away from the cups carried by the rim flange *f* against the action of the springs *d* and conversely the tendency of the rim will always be to return to concentric position with regard to the hub when released from its load, although naturally when running and under the influence of the weight of the vehicle the position of the rim will be eccentric to the hub but always varying under the inequalities of the road, the torque on the axle and the rotation of the wheel. Each freely suspended cup carrying plate, although constrained radially and rotatively relatively to the hub of the wheel, yet by reason of its being free to move parallel to the axis will allow of the cups which it carries being forced laterally against the restraining pressures of the axially acting springs through distances which may or may not be equal for the several cups according to circumstances. To keep the balls under all circumstances in contact with both surfaces of the opposing cups *h j* and to prevent excessive departure of the rim portion with annular flange *f* from its central plane when subject to external lateral stresses suitably formed stops or pegs such as *l l*, Figs. 2 and 3, may be provided attached to the rim flange *f* and impinging upon pads or projections *m* on flanges *b c* before the springs on the other side of the flanges *f* lose all their compression. It will thus be impossible for any individual spring or ball to become slack owing to its neighboring spring or springs on the opposite side of the wheel being unduly compressed by an external side shock. When the cups *h* on the rim flanges *f* are staggered instead of being back to back the supporting metal at the backs of these cups forms a very suitable equivalent for the pads or projections *m*, and pegs such as *l* will then be attached to the hub flanges *b c*. This modification is not illustrated but will be obvious. Stops *n n*, Fig. 1, may be provided to limit the motion of the cups and the extent to which the springs *d* can be compressed.

My invention may be used with any number of cups and balls, but for the purpose of securing an efficient drive and easy motion with all the balls and cups in continuous contact when they are mounted symmetrically about the axis of the wheel on a rigid plate, and to reduce the necessary amount of accurate adjustment of the parts, it is of great importance to place the said cup and ball connections at three points only on each side of the plane of the wheel.

The opposite hub flanges b c may be fitted on the hub in the form of sleeves, or as shown in the drawing they may be formed as two parts of the hub coupled by through bolts o around which suitable clearance apertures p will be provided in the rim flange f to give and yet limit the necessary freedom of motion between the members of the wheel. The spring pressed intermediate plates e e may also themselves be drawn together by connecting springs, but such added pressure will not add to the lateral stability although it will increase the vertical and torsional resiliency (this construction is not illustrated).

In another modification shown in Fig. 5 the spring pressed cup carrying plates e may be themselves mounted on the axle or hub q or a part attached thereto both being free to slide axially on the axle or hub q subject to the restraining influence of axial springs such as d, the plates e being guided by their bores r which bores may be bell mouthed as shown to allow of tilting of the cup-carrying plates upon which the springs act. If torque has to be provided for, the plates e must be restrained from rotating relatively to the hub. It would be possible to employ only one sliding spring pressed plate such as e and to fix the other set of outer cups on the outer flange, but two sliding plates, each spring pressed, will generally be found preferable. Torque and load will or may be transmitted from the hub flanges to the rim flange either by the said through bolts o or equivalent pegs on the hub flanges passing loosely through holes in the spring-pressed intermediate plates e or through the intervention of flexible connections between the hub flanges and the spring pressed plates and thence through the cups and balls to the rim, or alternatively through flexible and extensible connections between the hub flanges and the rim flanges.

In Figs. 1 and 2 torque and load are transmitted from the hub flanges b c to the intermediate plates e e by flexible connections which are here shown in the form of links s s which connect the said plates from convenient points as at t to the neighboring through bolts o. In the drawing three such links are provided on each side of the wheel and these while conveying torque and load have a certain amount of play or flexibility at their ends to allow the plates e to make the necessary axial movement. For each link may be substituted a pair of oppositely acting flexible links each link then being subject to tension only. The links may be made of resilient material instead of having play at their ends, and such are included in the term "flexible connections" where used.

Fig. 4 shows the construction shown in Fig. 1 reversed, the freely suspended cup carrying plates e being carried by the rim member which is formed of two plates u suitably spaced apart and corresponding to the hub flanges b c in Fig. 1. The construction is otherwise similar to Figs. 1 and 2. It is however to be remarked that for high speeds or heavy vibration a construction such as shown in Fig. 1 is preferable because the springs and cup carrying side plates are protected from the vibration and shocks which are intercepted by the cup and ball devices, and converted into harmless compression stresses, a feature of my preferred construction on which I lay special stress.

Figs. 6 and 7 show a modification adapted for a wheel which is to undergo excessive strains or is to carry a very heavy load. In such a case it may be necessary to distribute the lateral stresses over a number of points of contact for which purpose the cups and balls are arranged in groups suitably spaced apart around the wheel. With such groups (in order to secure the requisite freedom of one group in regard to the others) they are mounted on separate plates w w w each plate being driven independently and having independent lateral movement against its respective supporting spring or springs d. These groups may however be pivotally mounted on freely suspended cup carrying plates of the kind shown at e in Figs. 1 and 2. These plates w are shown as being driven by through bolts x which may pass slackly through the centers of the plates which are guided and driven thereby, the plates being so mounted upon the bolts as to permit of a very slight wabbling movement thereon which gives the required freedom of motion and minimizes friction. In the drawing each group is shown as consisting of three sets of cups and balls h and k to each plate, but there is no limit to the number of groups or balls in each group that may be employed. If required the plates w may instead of being driven by through bolts x be coupled to through bolts or pegs or coupled to the hub by flexible links such as s as above described in which case the plates should be flexibly linked the one to the other to prevent relative radial and rotational movement.

It is obvious that, providing the resultant of the action of all the springs is axial or parallel to the axis of the wheel, individual springs need not act in an axial direction; thus said springs might act from the rim to the cup carrying plates at a very oblique angle such as that usually formed by the spoke of an ordinary tension wheel, and these springs may then perform the function of spokes in addition to the function of pressing the intermediate plates against a central hub flange. Such a modification is illustrated in Figs. 8 and 9, which show a construction somewhat similar to Figs. 1 and 2 where cups and balls are employed to support two side flanges or cup carrying plates y y on either side of the central hub flange z, by the resiliency of tension spokes 2, 2, which connect the flanges y to the rim, said cup carrying plates y obtaining their required lateral motion under the resiliency of the tension spokes 2, 2, when displaced by the movement of the cups and balls under the relative displacement of the hub and rim. If required the spokes 2 may themselves be stiff spiral springs or be supplemented by springs such as 3 at their ends or other suitable position in their length to secure the required amount of resiliency. The cup carrying plates y may be extended inward as at 4 to form stops to limit the movement and for sheltering the springs 3.

What I claim as my invention, and desire to secure by Letters Patent is:—

1. In a spring wheel, the combination of relatively movable hub and rim members, a plate fixed to one of said members carrying cups for receiving rolling balls, free plates carrying cups facing the cups on the fixed plate, such free plates being freely suspended from one of said members, springs pressing the cups of the suspended plates toward the cups of the other fixed plate, and rolling balls between the opposing faces of the cups, the freely suspended cup-carrying plates being capable of permitting unequal movements of the cups approximately parallel to the axis of the wheel as required by the varying conditions of torque and load.

2. In a spring wheel, a hub and rim connected by an arrangement comprising a pair of plates maintained at a fixed distance apart, springs abutting against said fixed plates, a pair of cup carrying plates pressed inward by said springs, a central cup carrying plate, and balls forming a rolling connection between the opposing cups in the cup carrying plates.

3. In a spring wheel, a wheel rim, a cup carrying plate connected with the rim, a hub, spring-pressed cup carrying plates freely suspended from the hub on either side of the cup carrying plate carried by the rim, and balls arranged between the cups on the respective rim and hub plates.

4. In a spring wheel, a hub comprising side plates maintained at a fixed distance, inner cup carrying plates, balls carried in said cups, a rim, cup carrying plates connected to the wheel rim, and springs pressing the inner cup carrying plates toward the cup carrying plate which is connected to the rim.

5. The improved spring wheel for vehicles and cycles comprising independently moving hub and rim members, plates disposed between said hub and rim members and suspended from one of such members, springs pressing on said suspended plates, rolling cup and ball devices coupling said suspended plates to one member of the wheel, said suspended plates being so mounted upon the other member of the wheel or driven therefrom as to be free to move along the axis of the wheel and adapted to allow of unequal axial movement of individual cups under the varying relative movement of the cup and ball devices and the laterally disposed springs, substantially as described.

6. The improved spring wheel for vehicles and cycles comprising the combination with independently moving hub and rim members, of suspended plates, springs forcing said suspended plates together, means for suspending and driving said suspended plates from one member of the wheel, said suspended plates being so mounted on said member of the wheel as to have axial movement in regard thereto, with freedom to tilt in regard to the plane of the wheel, but restrained in other directions, rolling cup and ball devices coupling said suspended plates to the other member of the wheel, said cup and ball devices being adapted to convert the relative movements of the hub and rim members into movements of the said spring pressed intermediate plates and which allow of unequal axial movement of the cups in regard to one another, substantially as described.

7. In a spring wheel consisting of hub and rim members having relative movement the one in regard to the other, groups of cups carried by one of said members, a number of plates each carrying groups of cups facing the other groups of cups, means for coupling the said plates to the other member of the wheel in such manner that each plate and groups of cups therein is capable of independent movement parallel to the axis of the wheel, rolling balls between the opposing faces of said cups, and springs pressing the opposing groups of cups together.

8. In a spring wheel, the combination of a hub member, a rim member, cups on said rim member, cups on said hub member facing the cups on the rim member, rolling balls between the opposing faces of said cups, said members being radially displaceable relatively to each other, and springs carried by the hub member and suspending the cups thereon, whereby the vibratory shocks which the rim member receives direct from the road are only transmitted to the springs through cups and balls, substantially as described.

9. In spring wheels such as are herein referred to, the combination with an inner cup carrying plate of stops to limit its movement in relation to the outer plates which serve as abutments for the springs, substantially as and for the purpose described.

10. The improved spring wheel for vehicles comprising the combination of a hub member, a rim member rotatively movable relatively thereto, a connection between the two comprising a plurality of sets of cup and ball devices and an independent spring for each set, adapted to permit unequal axial movement of said cup and ball devices.

11. The improved spring wheel for vehicles comprising the combination of a hub member, a rim member rotatively movable relatively thereto, a connection between the two comprising a plurality of sets of cup and ball devices and an independent spring for each set, adapted to permit unequal axial movement of said cup and ball devices, and means for driving one of said members from the other, such means being independent of such opposing means, and being adapted to permit such relative movement.

12. In spring wheel such as are herein referred to, the combination with a freely suspended cup carrying plate, of springs between the same and one member of the wheel, and means for driving said freely suspended plate from said member of the wheel, stops fixed upon the other member of the wheel and projecting toward the back of the cups on the freely suspended cup carrying plate, curved pads on the back of said freely suspended cup carrying plates, said pads being so formed as to be always in relative relation to the stop during the movement of the wheel, whereby the stop will, under excessive side strain or shock engage said curved pad and preserve the lateral stability of the wheel.

In witness whereof, I have hereunto signed my name in the presence of two subscribing witnesses.

PERCY JOHN NEATE.

Witnesses:
HENRY ALLEN PRYOR,
ROBERT MILTON SPEARPOINT.